United States Patent
Urrutia et al.

(10) Patent No.: US 10,755,358 B1
(45) Date of Patent: Aug. 25, 2020

(54) METHOD AND SYSTEM FOR ENABLING INTERACTIVE COMMUNICATIONS RELATED TO INSURANCE DATA

(71) Applicant: United Services Automobile Association (USAA), San Antonio, TX (US)

(72) Inventors: Roberta Urrutia, San Antonio, TX (US); Pamela Glimm Diener, San Antonio, TX (US); Shanna Ruth Limas, San Antonio, TX (US); Jennifer Lynn Darland, Helotes, TX (US); Richard Paul Proft, San Antonio, TX (US); Cleburne Robinson Burgess, Helotes, TX (US); Regina Rose Van Nest, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 522 days.

(21) Appl. No.: 15/346,050

(22) Filed: Nov. 8, 2016

Related U.S. Application Data

(63) Continuation of application No. 13/828,790, filed on Mar. 14, 2013, now Pat. No. 9,501,798.
(60) Provisional application No. 61/666,278, filed on Jun. 29, 2012.

(51) Int. Cl.
*G06F 3/048* (2013.01)
*G06Q 40/08* (2012.01)
*H04L 12/58* (2006.01)
*G06Q 20/10* (2012.01)

(52) U.S. Cl.
CPC ............ *G06Q 40/08* (2013.01); *G06Q 20/10* (2013.01); *H04L 51/16* (2013.01)

(58) Field of Classification Search
CPC ......... G06Q 40/08; G06Q 20/10; H04L 51/16
See application file for complete search history.

(56) References Cited

U.S. PATENT DOCUMENTS

| | | | | |
|---|---|---|---|---|
| 8,015,091 B1* | 9/2011 | Ellis | ...................... | G06Q 40/00 705/35 |
| 8,375,331 B1* | 2/2013 | Mayers | .................. | G06Q 50/01 705/319 |
| 2003/0120588 A1* | 6/2003 | Dodd | ..................... | G06Q 20/10 705/38 |
| 2009/0024273 A1* | 1/2009 | Follmer | ................. | G06Q 10/10 701/33.4 |
| 2011/0219087 A1* | 9/2011 | Jorasch | ................. | G06F 16/957 709/206 |

* cited by examiner

*Primary Examiner* — Anil N Kumar
(74) *Attorney, Agent, or Firm* — BakerHostetler

(57) ABSTRACT

A method of providing user interaction includes providing a processor and transmitting a communication from a first party to a second party. The method also includes posting, using the processor, an entry associated with the communication on a website, receiving a second communication from the second party to the first party, and posting, using the processor, a second entry associated with the second communication.

20 Claims, 12 Drawing Sheets

FIG. 3

Member View

☑ Colonel Smith, John Vehicle Collision Loss - 04/11/2012

| Details | Wall | eDocs |

Communications

You can schedule your appraisal and rental by accessing them in your To Do List in the Claim
Overview and To Do List section.
January 15, 2012 | 3:45 p.m. CT

*Add your comments to this conversation...*
[Upload] Add a photo or file to a new conversation.                    [Post]

Claim Overview & To Do

Photos and Documents

Jan Smith  Thank you for reporting your claim. This is the Claims Wall. We can use this space to exchange information, and attachments in a secure manner. We will periodically post on the Wall to notify you of status on your claim. We will send an alert to your primary e-mail when things are posted here, unless you have changed your settings in alert preferences or from the settings in the App on your mobile device or iPad.

If you have questions or need additional information about your claim:
- Post a message on here and receive a response within 6 hours.
- Call us at 1-800-531-       (8722) or
- Fax documents to 1-800-531-8669 and reference your claim number.

We value your business and the opportunity to serve your insurance needs.
January 15, 2012 | 3:45 p.m. CT Inspections Rental Vehicle Coverage Summary

*Add your comments to this conversation...*
[Upload] Add a photo or file to a new conversation.                    [Post]

Helpful Tips

Member View

☑ Colonel Smith, John Vehicle Collision Loss - 04/11/2012

[ Details ] [ Wall ] [ eDocs ]

Communications

Claim Overview &To Do

Photos and Documents

Inspections

Rental Vehicle

Coverage Summary

Helpful Tips

Communication Center

Welcome to the Claims Wall, a convenient hub for exchanging claims-related information with us — including photos and PDFs. Allow up to four hours for us to respond to your inquiries.

>> Update your Notification Preferences

Message

Lorem ipsum dolor sit amet, consectetur adipiscing elit. Phasellus nisl nibh, molestie nec vulputate ut, mattis sit amet leo. Aliquam erat volutpat. Pellentesque nisl elit, consectetur venenatis sodales volutpat ut at leo. Integer vehicula ligula vel ligula fermentum tristique.

13 Characters Remaining

[ ⏏ Attach a related photo or PDF file. ]

[ Cancel ] [ POST ]

Note: Any comments, or files you post here will become a permanent part of your Claims record.

Conversations

[ Recent Post ] Jan Smith Apr 16 @ 3:45 p.m. CT

Proin augue leo, consectetur vel placerat id, feugiat nec est. In accumsan tortor nisl, nec viverra magna. Etiam venenatis hendrerit mollis. In pretium aliquet mollis. Vestibulum feugiat justo

[ Reply or Attach ]

Tasks

| | Unit## | MST2All | | Filter | | Review Comms Center Posts | | | |
|---|---|---|---|---|---|---|---|---|---|
| Message | Notified | ID# | Loss# | Task | Status | Associated to | Received | Other |
| | 05/01/2012 | 9678122 | 1 | Review Comms Center Post | WIP | | 05/01/2012 08:00 am | CT |
| | 05/01/2012 | 1223444 | 14 | Review Comms Center Post | WIP | | 05/01/2012 11:26 am | TX |
| | 05/01/2012 | 4455123 | 24 | Review Comms Center Post | New | | 05/01/2012 01:30 pm | NJ |
| | 05/01/2012 | 1324999 | 7 | Review Comms Center Post | New | | 05/01/2012 03:30 pm | VT |

FIG. 11

MSR View

☑ Colonel Smith, John   #86869133   L/R #016   DOL 09/22/2006

[Details]   [Wall]   eDocs

WallSummary ▷

Conversation3 ▷

ImaRep Colonel Smith, I have attached a copy of the initial photo the appraiser took of your car's damages. If you have any questions, feel free to post your question here.
Initial photo BURGER CHRYSLER PLYMOUTH INC.pdf
2/21/2012 | 7:39 a.m. CT

Conversation2 ▷

JohnSmith: I'm really think that this Wall thing is great. And I uploaded some photos of the accident scene.
Crash_pic1.pdf
Crash_pic2.pdf
2/1/2012 | 2:14 p.m. CT
    ImaRep Thank you for the pictures, Colonel Smith. I'll use them in my investigation.
    2/2/2012 | 6:45 a.m. CT

Conversation1 ▷

ImaRep: Hello and thank you for reporting your claim this is the claims wall. Unlike e-mail, we can use this space to exchange information, and attachments in a secure manner. If you want to be notified when things are posted here, set up your alert preferences blah
2/1/2012 | 2:14 p.m. CT
    JohnSmith This is awesome. ____'s coolness factor just went up! Where's the like button?
    2/2/2012 | 6:45 a.m. CT
    ImaRep We're glad you like it -- we're proud of it, too!
    2/2/2012 | 10:36 a.m. CT

FIG. 12

METHOD AND SYSTEM FOR ENABLING INTERACTIVE COMMUNICATIONS RELATED TO INSURANCE DATA

CROSS-REFERENCES TO RELATED APPLICATIONS

This application is a continuation of 13/828,790, filed Mar. 14, 2013, issued Nov. 22, 2016 as U.S. Pat. No. 9,501,798 entitled "Method and System For Enabling Interactive Communications Related to Insurance Data" and claims priority to and the benefit of expired U.S. Provisional Patent Application No. 61/666,278 filed Jun. 29, 2012, entitled "Interactive Claims Wall," which is incorporated herein by reference in its entirety. This application claims priority to U.S. Provisional Patent Application No. 61/666,278 filed Jun. 29, 2012, entitled "Interactive Claims Wall," the disclosure of which is hereby incorporated by reference in its entirety for all purposes.

BACKGROUND OF THE INVENTION

Customers demand more of the products and services they use than ever before. They insist that the companies they deal with on a regular basis provide them greater and greater levels of accuracy and more tailored service offerings. Companies configure and operate ever increasing numbers of computer systems to achieve this using sources of information that have traditionally been unavailable when servicing these customers is now expected.

SUMMARY OF THE INVENTION

The present invention relates generally to insurance systems. More specifically, the present invention relates to methods and systems for communicating between an insurer and the insured.

It is currently challenging for loss parties and member service representatives (MSRs) to communicate with one another. When a loss party calls an MSR, the MSR is most often on the phone handling another loss. When the MSR calls the loss party, they are often not home. The result is a great deal of phone tag, voice mail and frustration. Existing electronic communication options are not supported on mobile devices and not integrated with insurer's self-service application for claims. Loss parties cannot receive or send electronic messages from their smart phones or from within the context of existing mobile Claims application. Accordingly, claims today can be settled at first notice of loss or go on for years.

Members do not always know the claims process, what to expect, how and to whom they can turn for advice and guidance during the claim.

The longer a claim lasts, the harder it is for the member to maintain context as to what's been done, and what's left to do. There can be multiple reps involved in a loss, including specialty reps, and co-workers pitching in to help a teammate. How can the member keep track of whom to contact if they need help?

Embodiments of the present invention, which can, in some implementations, be referred to as an Interactive Claims Wall, provide a one-stop record of all the back and forth communication between the member and the insurer. It's a secure portal for Social Media style communication between MSRs and members regarding their claim that is integrated with the insurer's mobile Claims application. The member can choose any channel to communicate with the insurer, but all communication is captured on the Claims Wall, with context for chronology and who the parties are who are communicating. The Claims Wall is available in any self-service channel. The insurer and the member can exchange documents, legal correspondence, photos and messages all within context of the Claims Wall.

The member, also referred to as a customer, can send their Claims Adjuster an email and a reply can be made on behalf of the insurer by email, with the entire email conversation being captured on the Claims Wall. Embodiments of the present invention are not limited to communication between the insurer and the insured and can be extended to Claimants, vendors, body shops, attorneys, doctors, etc. The system described herein is well suited for portions of an insurer's business that interact with Case Management (i.e. Mortgage, Financial Planning, etc.). When information is posted on the Claims Wall (also referred to as the Wall), the Member will be notified by the method of their choosing (email, text, push notification).

According to an embodiment of the present invention, a method of providing user interaction is provided. The method includes providing a processor and transmitting a communication from a first party to a second party. The method also includes posting, using the processor, an entry associated with the communication on a website, and receiving a second communication from the second party to the first party. The method further includes posting, using the processor, a second entry associated with the second communication on the website.

According to another embodiment of the present invention, a graphical user interface is provided. The graphical user interface includes a first section including a listing of categories and a second section including a chronological list of communications. A subset of the communications are accessible by selection of one of the listing of categories.

According to a particular embodiment of the present invention, a method of populating a Claims Wall is provided. The method includes providing a processor, identifying that an activity has occurred, and determining, using the processor that an automatic post is to be made. The method also includes determining, using the processor, a mode of communication for the post, transmitting information related to the post to a customer using the mode of communication, and populating the Claims Wall with the post.

According to an alternative embodiment of the present invention, a system for receiving insurance data is provided. The system includes a processor and a network interface device configured to receive a communication for a first party from a second party. The system also includes a storage device configured to store the communication. The processor is configured to determine a post for the first party. The network interface device is further configured to receive a second communication for the second party. The processor is further configured to determine a second post for the second party. The first user can be an insurance policy holder. The storage device can include a database and the database can include a table correlating posts to members of a membership organization. In an example, the first post appears on a first Claims Wall and the second post appears on a second Claims Wall.

Numerous benefits are achieved by way of the present invention over conventional techniques. For example, embodiments of the present invention provide for increased efficiency in claims processing. These and other embodiments of the invention along with many of its advantages and features are described in more detail in conjunction with the text below and attached figures.

BRIEF DESCRIPTION OF THE DRAWINGS

FIG. 3 illustrates a graphical user interface suitable for use with embodiments of the present invention;

FIG. 4 illustrates a graphical user interface suitable for use with embodiments of the present invention;

FIG. 5 illustrates a graphical user interface suitable for use with embodiments of the present invention;

FIG. 7 illustrates a graphical user interface suitable for use with embodiments of the present invention;

FIG. 9 illustrates a graphical user interface for a tablet device suitable for use with embodiments of the present invention;

FIG. 10 illustrates a graphical user interface for a mobile device suitable for use with embodiments of the present invention;

FIG. 11 illustrates a graphical user interface suitable for use with embodiments of the present invention; and FIG. 12 illustrates a graphical user interface suitable for use with embodiments of the present invention.

DETAILED DESCRIPTION OF SPECIFIC EMBODIMENTS

Figure 1:
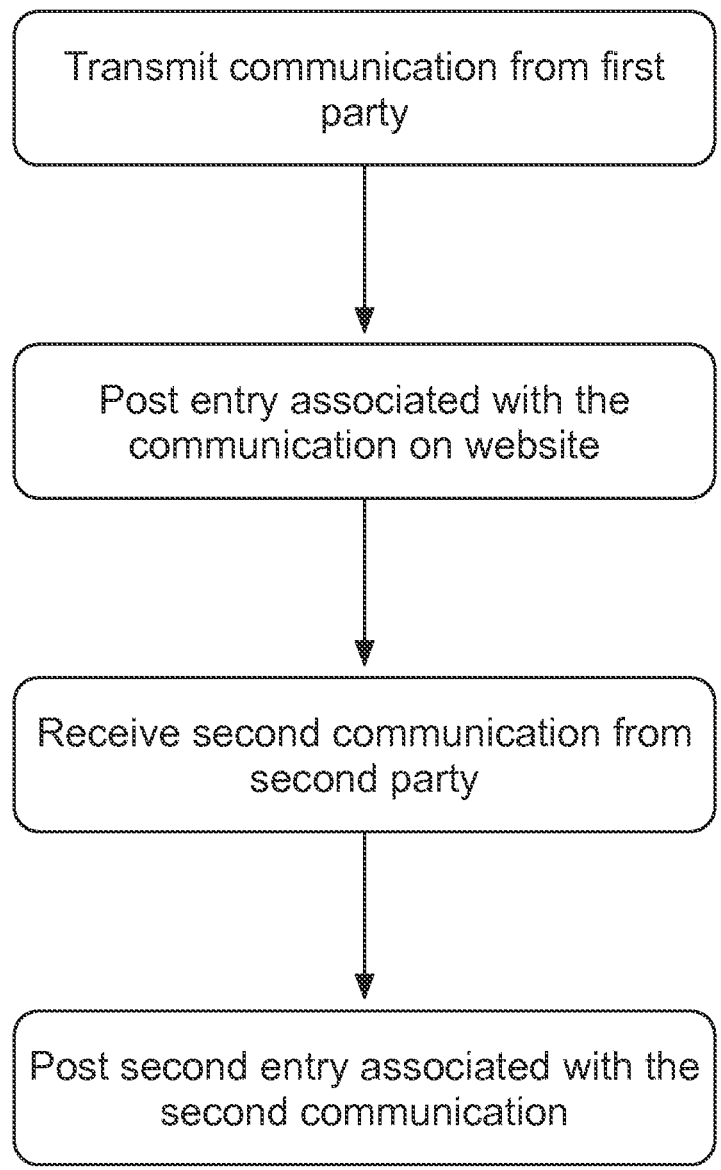
FIG. 1 is a high level flowchart illustrating a method of providing user interaction according to an embodiment of the present invention.

Current claims processing systems are typically characterized by lengthy and inefficient communications processes. Embodiments of the present invention provide methods and systems in which multiple communication media, including mobile phones, tablets, personal computers, and the like can be used to communicate within the context of a loss that has occurred, whether the loss be an automobile loss, a property loss, or the like.

Embodiments provide a Claims Wall that enables communication between multiple parties, including the insurer, the insured, third party service providers, and the like. The communication can be related to the status of a claim, information related to the loss, including sharing of documents, photos, links, and the like, to provide an improved claims experience. As an example, a post could be placed on the Claims Wall when an adjuster opens a loss matter, for example, introducing the concept of the Claims Wall, which provides a virtual location in which communication can occur in relation to the loss. The insured can respond to the post, which could be delivered to the adjuster or notify the adjuster of the response, could start a brand new conversation on the Claims Wall, which could be routed to the particular adjuster or another predetermined party.

In some embodiments of the invention, any party that has a connection to the claim may have access to a Claims Wall to provide an interface for them to obtain and supply relevant information. Such parties may include, but are not limited to: driver, passenger, owner, mortgagee, lienholder, tenant, contractor, repairman, property association, property manager, reporting person, police, fire, injured claimant, responsible person or company, witness, suspect, government office, manufacturer, moving and storage, expert, independent adjuster/staff, member, insurance company, insurance adjuster, insurance agent, attorney, attorney firm, public adjuster, guardian, employer, doctor or hospital. In yet other embodiments of the invention, parties with no or little connection with the claim may gain access to a Claims Wall to assist others in filing their claims; this may be particularly useful in disaster scenarios such as after hurricanes or other natural disasters.

As an example, processing of a loss event could be initiated either by the insured placing a call to the insurer, initiating the process through a self-service channel, or other techniques for opening a claim file. As discussed herein, opening of the claim file could result in an automatic post to the Claims Wall, providing information to the insured and requesting an information exchange process. In some implementations, the opening of the file is a trigger that initiates the posting to the Claims Wall. One of ordinary skill in the art would recognize many variations, modifications, and alternatives.

In a particular embodiment, the first post to the Claims Wall can provide introductory information about the Claims Wall, explaining how interaction is facilitated by the Claims Wall, including information on how an insured person can post their questions on the Claims Wall, specify communications preferences, provide contact information such as a phone or fax number. When the loss begins to be processed by an adjuster, an additional automated post could be generated that provides an introduction to the adjuster and a notification to the insured that the claim file has been opened.

As described herein, the Claims Wall enables adjusters, other personnel associated with the insurer, third parties, the insured, or the like to automatically or manually post messages. When certain milestones are hit, messages can be posted automatically. Thus, in addition to these initial posts, automated posts can be provided throughout the life of the loss/claim, for example, when estimates are received and payments are issued, and when other significant milestones are hit, reducing the burden on the insurer to manually notify the insured with information related to the loss.

Accordingly, the Claims Wall enables customer service representatives to communicate with the insured, for example, updating the insured on the status of a claim, without having to receive one or more phone calls and then manually respond to questions from the insured. In an embodiment of the invention, the customer service representatives or MSRs may be able to indicate that a message is sensitive, such that it is not sent to the user via an insecure communications means such as e-mail. This indication may be made using a checkbox in the messaging interface, or may automatically be triggered based on certain words or certain types of attachments. In an embodiment, the member can only see sensitive messages by accessing the Claims Wall via a secure interface such as an HTTPS internet connection.

FIG. 1 illustrates a flow diagram showing an embodiment of the invention including a method for providing user interaction. The method includes a step for transmitting communication from a first party; posting an entry associated with the communication on a website; receiving a second communication from a second party; and posting a second entry associated with the second communication on the website. The first party may be an insurance policy holder such as an insured driver, or a passenger of an insured driver. The second party may be a claims adjuster working for an insurance company or a membership organization. In other embodiments the two parties may be any number of other parties listed above in the detailed description.

Figure 2:
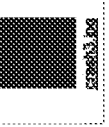
FIG. 2 illustrates a graphical user interface suitable for use with embodiments of the present invention.
Figure 3:
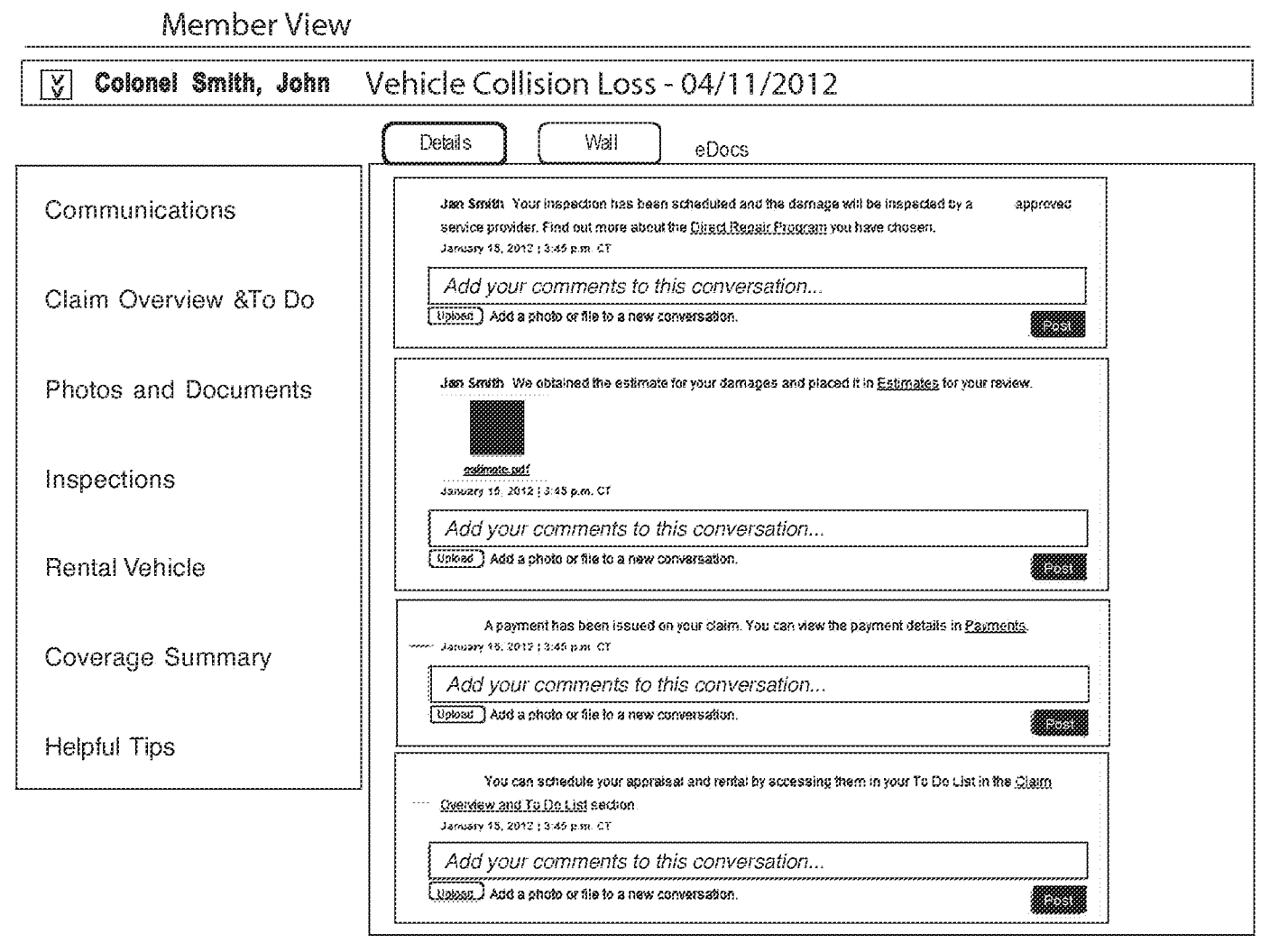

FIG. 2 illustrates another example of a Claims Wall on an insurer's website. The Claims Wall illustrates
- a) photo thumbnails attached by the member. Clicking on the photo thumbnail would pull up the picture full size in a separate window.
- b) A member's comment to a claims adjuster's post.
- c) A claims adjuster's post containing a link to other info on website FIG. 3 illustrates yet another example of a Claims Wall on an insurer's website. The Claims Wall includes a document posted by Jan Smith claims adjuster. (Typically, this would be a posting that is automated, but it's illustrated here to demonstrate that an adjuster can post documents). An automated post by the insurer that a payment has been issued. An automated post by the insurer reminding the member that he has To Dos.

FIG. 4 illustrates a Claims Wall with an initial wall post. Although the adjuster's name is illustrated, this can be an automated post and not indicate the adjuster's name.

Figure 5:
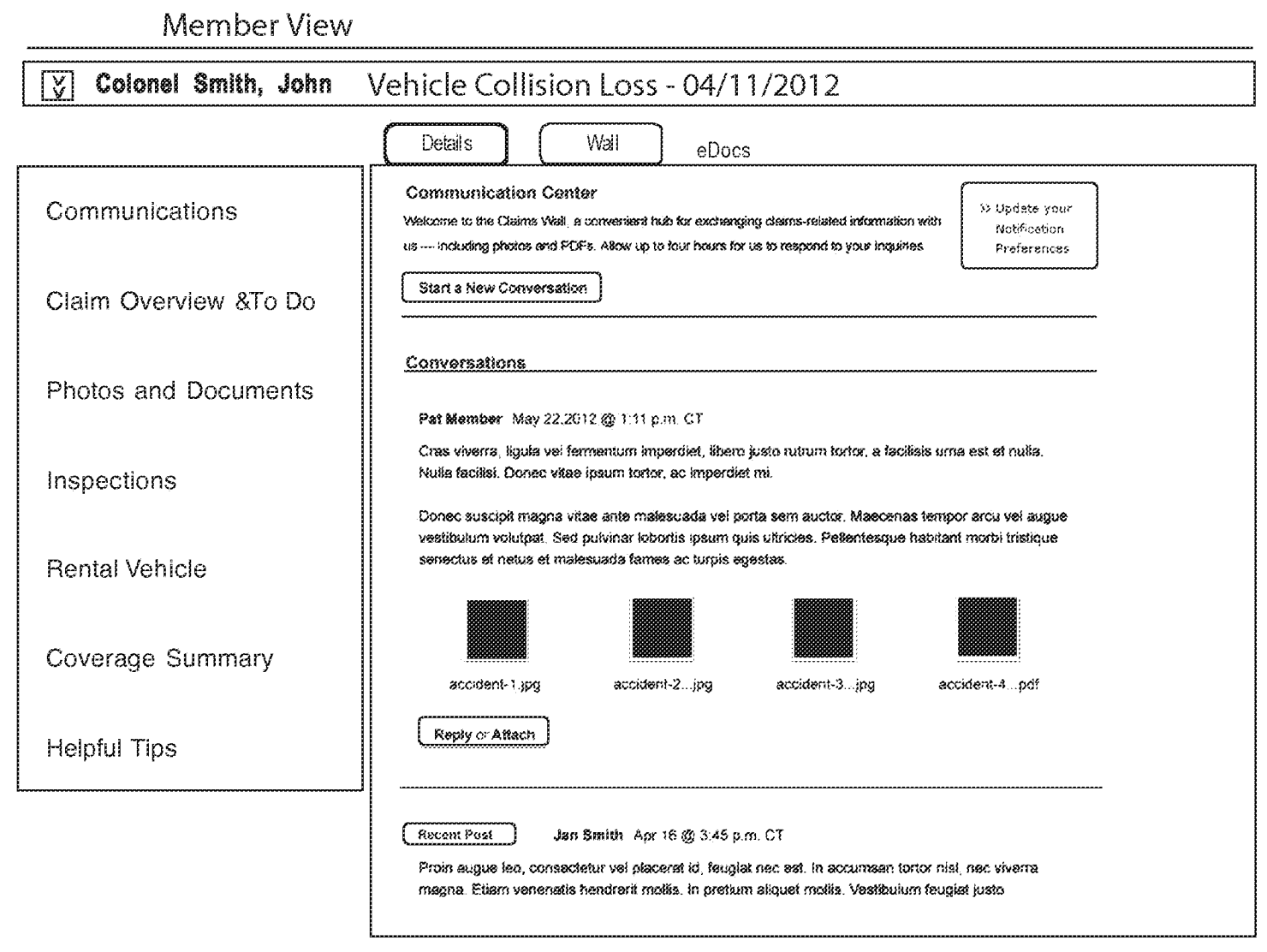

FIG. 5 illustrates another version of the Claims Wall, which saves screen real estate by not showing the text entry fields. If the user clicks 'Start a New Conversation' or 'Reply or Attach' button, a field will display to type the user's comment/question.

FIG. 7 illustrates the Claims Wall after the user has clicked the 'Reply or Attach' button and is in the middle of typing a message. As indicated in this example, there are only 13 characters remaining, although other embodiments provide a greater data limit. Once the user clicks the Post button, the message will be posted and look similar to the post by Jan Smith on April 16th at 3:45 pm. In other embodiments, there will be a recent post indicator and count. For example, every post newer than seven days may have a recent indicator. The posts may automatically be reclassified as they age. In another embodiment, posts that the user has not seen before may be marked as new.

Figure 8:
FIG. 8 illustrates a graphical user interface for a mobile device suitable for use with embodiments of the present invention.

FIG. 8 illustrates an example of a Claims Wall on an iPhone.

Figure 9:
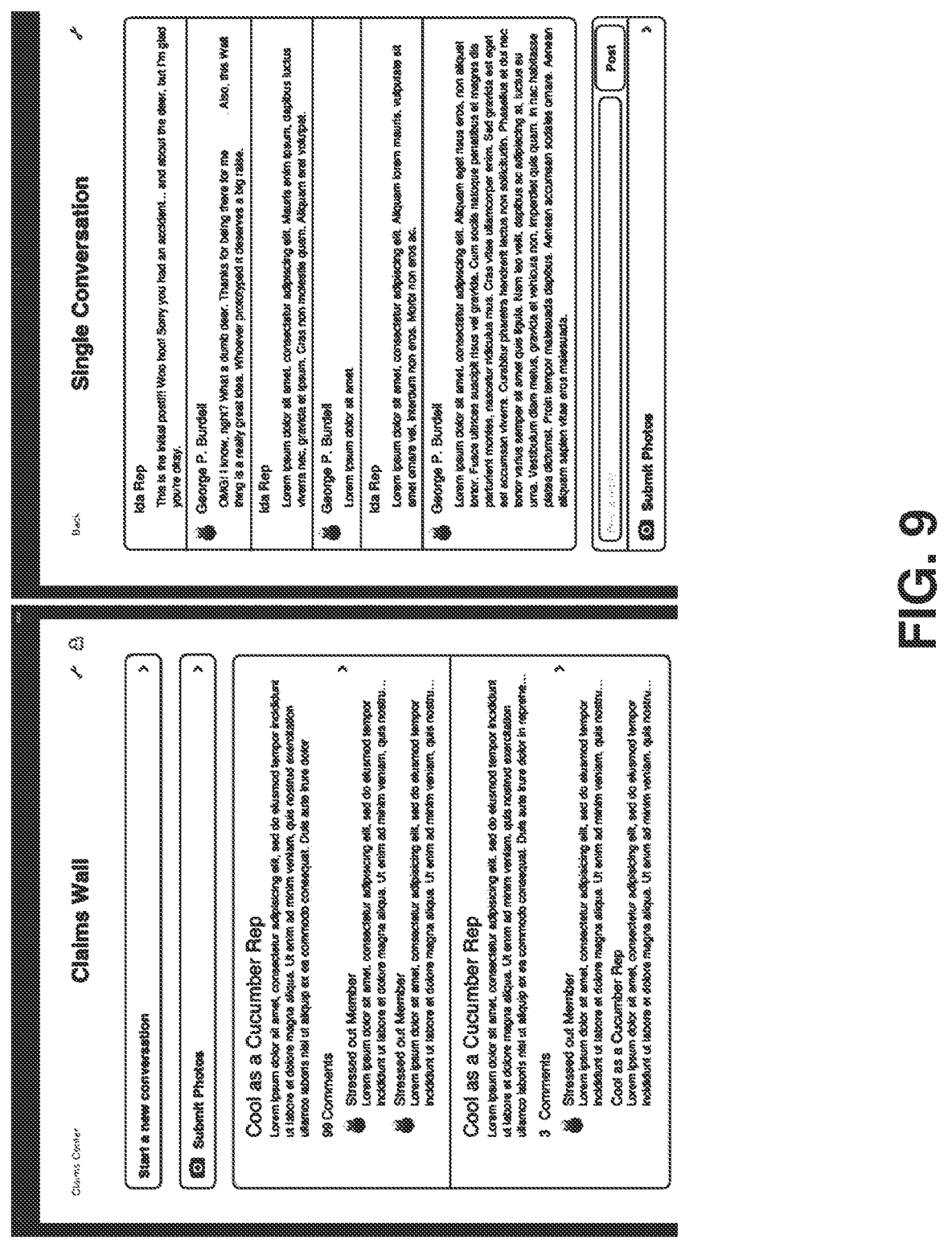

FIG. 9 illustrates an example of a Claims Wall on an iPad. The pane on the left shows my Conversations and the two most recent comments within that conversation. The pane on the right would not be seen in some embodiments. If the user taps anywhere on the conversation, the pane on the right will slide on top of the left pane and the left pane would then be hidden. The user could utilize this functionality when they want to see the rest of the comments for that conversation.

Figure 10:
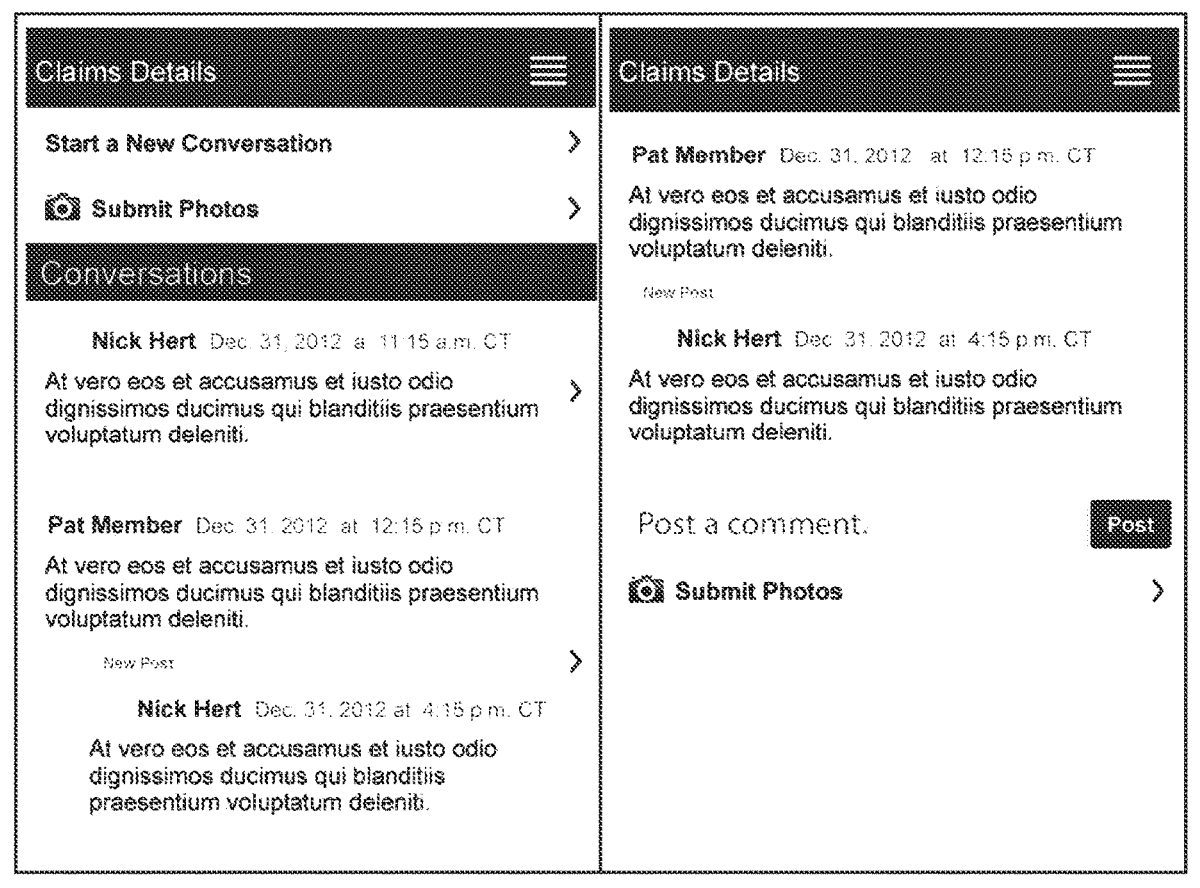

FIG. 10 illustrates an example of a Claims Wall on an Android phone. Only the pane on the left would be visible with the conversations and only the most recent comments for that conversation in the illustrated embodiment. If the user wants to see more, they would tap on the conversation (note: tapping on a thumbnail or PDF within a conversation will launch the document not the additional comments in an embodiment) and the right pane would display with the rest of the comments for that conversation.

FIG. 11 illustrates a Claims Work List that according to an embodiment of the present invention. As illustrated in FIG. 11, the. Claims Work List shows the MSR two items in yellow getting ready to approach a 6 hour service level objective and three items that are over 6 hours old. In other embodiments, different timing thresholds are utilized in the Claims Work List.

FIG. 12 illustrates a user interface that may be used by a claims adjuster, a claims representative or an MSR in an embodiment of the invention. The view may include a summary of the representative wall, or a summary of all the walls for the various parties that walls are available for, including extracts from posts by those parties as well as posts by the representative. The interface may also expose other information relating to the claim.

In order to facilitate automatic notifications, embodiments of the present invention provide for a preference specification process in which the insured can specify how the insured would like to be notified, for example, by e-mail (which can be a default setting), by text message, push notifications to/from their mobile devices, or the like. As an example, if a person has specified a preference for email, a notification can be sent indicating that content has been posted onto the Claims Wall. In some embodiments, only a notification is sent, whereas in other embodiments when content is posted on the wall, some or all of the content can be sent to the specified e-mail account(s), enabling the insured to receive information without logging into a website and viewing the Claims Wall. Over time, the Claims Wall will include some or all of the interactions that are occurring between the insurer and the insured.

In some cases, information is confidential and content will be flagged, for example, by a customer service representative, so that this confidential information will not be posted on the Claims Wall, or will be posted in a manner so that portions or all of the confidential information will only be viewable by parties with appropriate access rights. Ease of use is provided for the vast majority of communications that don't require the security, while allowing a user to log in behind the firewall for those communications that may have some sensitive information included in or in conjunction with the content.

In insurance applications, there are some documents that, for example, by regulation or policy, cannot be delivered in an insecure environment such as e-mail. For such documents, posting of the document on the Claims Wall could result in an e-mail message with a link that would enable the user to log into a secure site, for example, behind a firewall, where the documents could then be viewed on the Claims Wall. Even for documents with relaxed security, links can be provided to guide the user to Claims Wall to view the document or other documents of interest. For some documents, portions of the information may be secure and only available after login, whereas other portions can be included in the e-mail including the link to the secure site.

Tables 1-25 provide description related to triggers that result in the generation of a post, information included in the posts, and the various channels that can be used in relation to the posts. As illustrated, in some channels that are less data intensive (e.g., texts), links to data can be provided rather than the data, which can be provided in channels with greater data bandwidths (e.g., e-mail). One of ordinary skill in the art would recognize many variations, modifications, and alternatives. The customer can specify a preferred channel or receive information through multiple channels.

Tables 1-25 provides examples of posts that are suitable for use with the Claims Wall. Embodiments of the present invention are not limited to the particular wording utilized in these examples and other phrasing, triggers, and the like are included within the scope of the present invention. During use, changes can be made, new triggers added, and the like. One of ordinary skill in the art would recognize many variations, modifications, and alternatives.

Thus, the examples described herein are not intended to limit the present invention but to merely provide examples of how, when a claim is initiated, an automatic post to the Claims Wall can be generated by the system, thereby initiating formation of the Claims Wall.

As illustrated in Tables 1-25, a plurality of milestones during the claims process can result in triggering of the system to generate automated posts.

Although much of the content in a Claims Wall be communications between the insurer and the insured, embodiments of the present invention are not limited to these communications and other materials, including documents related to a loss are include in the scope of the present invention. Additionally, in addition to the insured, other parties can be provided with some or complete access to the Claims Wall or may have a separate Claims Wall (which can share overlap with the insurer-insured Claims Wall). As examples, a claimant of the insured may have a wall, a passenger in a vehicle involved in an accident may have a wall, third party providers, attorneys, medical personnel, investigators, or the like. Thus, in general, a loss may have a plurality of walls accessible to and showing differing information to multiple parties. The various parties can view differing Claims Walls, for example, a claimant may view certain items as opposed to the insured. The customer service representative may have a view of all items (i.e., a master Claims Wall), with the other parties having a redacted set of items from the master Claims Wall.

Although embodiments of the present invention are discussed in relation to insurance claims, the present invention is not limited to claims and can be applied in other business environments.

As another example, during a catastrophe, a public wall scenario can be utilized in which persons involved with a catastrophe can post and discuss with others that are going through the same scenario, broadening the concept to communities of shared interest. For a particular insurance company, a wall could be established for all insured living within a predetermined vicinity of the catastrophe, with an automatic notification enabling the insured to access information easily.

Embodiments of the present invention provide improvements in communication not available using conventional techniques, for example, enabling a repair shop to post information on the status of the repair of a vehicle, with an automatic notification being generated to the insured and/or the insurer upon posting or triggered by the posting. Thus, rather than relying on the insured to call the repair shop or a service representative (who may have to call the repair shop), status updates can be provided with increased efficiency.

Embodiments of the present invention are not limited to a single wall, which can have subsets accessible and/or visible to different parties, but include a wall of walls, providing a hierarchy of information content and display.

The Claims Wall provides, not only a place where various parties are able to communicate, but serves as a repository for communications and documents.

As an example, if a letter is sent by regular mail, the correspondence can be digitized and placed on the Claims Wall. As another example, if an email is sent through an e-mail channel, the email can be posted on the Claims Wall, and a similar procedure can be applied to texts. In some implementations, phone calls can be recorded and stored so that they are accessible via the Claims Wall, thereby providing a central hub for all communications related to a claim.

Since events related to insurance can result in complicated claims processes, the Claims Wall provides a system for an insured or other parties to see the story of their loss as communications, documents, and the like are organized so that the insured and insurer are able to see the story and as it progresses over time. In one implementation, information can be ordered in a reverse chronological order. In another embodiment, the materials can be organized by category, for example, pictures and documents, which would be accessible by clicking on a link that would provide the user with a listing of pictures and documents related to the claim. The data can be searchable, enabling a user to find documents containing certain phrases, associated with certain dates, or the like. The posts can be grouped in threaded conversations, with conversations grouped in reverse chronological order in some embodiments and comments related to the conversation grouped together with the related posts.

In some claims scenarios, specialists may handle certain claims processing functions, resulting in the insured interacting with multiple entities at the insurer. Accordingly, conversations with different individuals can be separated so that the user can maintain a dialogue about a first claims processing function (e.g., settling the total loss on their vehicle) independent from another dialogue with a person that is helping the insured with an injury. Communications and comments can thus be routed to the appropriate party in conjunction with posting on the Claims Wall. In an embodiment, materials can be filtered by adjuster, providing a subset of the documents and conversations associated with the particular adjuster or set of adjusters.

Referring to FIG. 1, a first portion of the user interface provides a set of tabs, for example, photos and documents, and the like. The various materials from the Claims Wall can be sorted and provided in subsets associated with the tabs.

Since some information can be confidential, materials posted on the Claims Wall can be categorized so that certain materials are available to all parties and some materials are only available to certain parties. As an example, a medical bill can be visible to an adjuster and the insured, but not to a passenger in the vehicle during the accident. As another example, the insured can see materials addressed to the insured, anything on which the insured was cc' ed, and the like. The person originating the document can assign privileges to the document, enabling selected people to view the document or see that the document exists. Documents that are sent to the attorney for the insured will not necessarily be available to the insured, conforming to certain restrictions placed on communications with people that are represented by an attorney. Documents associated to minor children may be available to parents, but not other family members that are not members of the household, for example.

In an implementation, the adjuster has the ability to manually take a document that is in the claim file and post it to the insured's wall. In multi-wall implementations, the adjuster can specify which of the walls the document should be posted. One of ordinary skill in the art would recognize many variations, modifications, and alternatives.

For documents that are electronically filed by items and parties, automatic categorization can be performed to post the document to a Claims Wall for the party associated with the document. Thus, where the document is filed in an electronic records system can be used to decide whether it would be an appropriate thing to post to a particular party's wall. Embodiments of the present invention enable certain comments or certain documents to be displayed or not displayed depending on previous tagging of the document in the electronic records system.

In some insurance claims systems, a tree structure is used to describe the associations between all of the items and parties in the loss, for example, the drivers of the vehicles involved in an accident, the attorneys for the drivers, the doctors for the drivers, and the like. Given this tree structure, each e-mail from a particular attorney can automatically be categorized and then posted to the Claims Wall of the appropriate person automatically.

As discussed above, original posts to the wall can be created in an automated manner when a file is opened, with the insured receiving, by default, an e-mail, but they can also specify in their preferences other preferred modes of communication. Depending on the kind of document or the kind of information that's being uploading, a link or an actual document can be sent to the insured or other parties.

As materials including communications are sent, these materials can automatically be included in a claim file and posted on the Claims Wall. When the insured posts something to the Claims Wall, a work item can be sent to the appropriate adjuster and be tied to a loss number. The claims adjustor can follow that work item to the loss and a full version of the Claims Wall. In one implementation, the full version of the Claims Wall will be accessible to the adjuster and will give the adjuster an option to post something to the Claims Wall, for example, adding their own documents. Additionally, the adjuster could forward the work item to a different adjustor if appropriate based on the content of the materials.

The Claims Wall can provide indications of the time that a work item has been active, providing adjusters with an indication of the urgency with which items should be addressed. Initially, a work item with a four hour window could be shaded green, turning to a yellow color after an hour, indicating that the priority for action has been increased. Additionally, a notification bar can be provided that will notify the adjuster than various work items are ready to expire. As an example, if a work item has expired after more than four hours in this example, the shading could be changed to red to further highlight the urgency to the adjuster. In another example, a work item type is provided for the wall post that can include a ticking timer that indicates the time since the work item was posted to the wall, providing an adjuster with an indication of the urgency for responding to the item.

The Claims Wall can provide visual indications of timeliness, for example, a conversation could be time-stamped and shaded with a color to indicate the urgency with which the conversation should be addressed. As an example, items on the wall can change color so that the insured or the adjuster can see the timeliness with which they should respond, for example, a time within which a member should provide photos in response to a request from an adjuster. If the materials are not provided in the time requested, an automatic notification could be provided to the member to trigger their action. As another example, items can be flagged to indicate an action item associated with the item. Recent posts can be indicated as recent for a predetermined period, for instance 120 hours. Posts can also be indicated as read or unread on the Claims Wall.

In an embodiment, a party can indicate an item on the wall and then after selection, send the item or supporting documents to a party such as a repair shop, a doctor, an attorney, or the like. In other embodiments, a third party such as an attorney or the repair shop can be invited to see the Claims Wall. Other options can be provided including printing, image capture, and the like.

The Claims Wall can be integrated with a corporate correspondence system. In these implementations, when a letter is generated using the corporate correspondence system, a copy of the letter could be placed on the Claims Wall and accessible to the customer to which the letter was addressed. For automobile repair estimates, when an auto repair estimate is received from an appraiser, the estimate can be posted to the wall. Documents received in paper form can be digitized, for example a medical report, which could then be assigned a security classification and posted on appropriate walls while remaining invisible to parties not authorized to view the medical report. A user interface associated with digitizing the document could be used to specify which Claims Wall would receive the medical report or other suitable documents. Accordingly, an adjuster can have the ability to either post a document on the Claims Wall or may mark it so that it will only be posted on Claims Walls accessible to certain persons.

In addition to documents and communications, the Claims Wall can provide educational content either independently or associated with particular communications and documents. These educational content can include text, videos, audio, or the like and be used to explain difficult concepts, such as how to sign two-party checks, holdback, the total loss process, or the like.

Accordingly, the Claims Wall can be used to push content to parties in order to help explain difficult concepts and expose the claims process, which can be complicated. As an example, a timeline of the claims process could be integrated with the Claims Wall, explaining where the insured is in the claims process. As another example, when a complicated portion of the process occurs, for example, the cutting of a two-party check, an automated post can accompany the notification of the check to provide educational content related to the action. The educational content can be provided either automatically or manually depending on the particular application. As another example, when a vehicle is a total loss, an automatic post can be generated providing educational information about the total loss process. Thus, embodiments of the present invention provide significant advantages over FAQs that have to be searched out and may not be relevant to the issue confronting the insured or other third party. Here, the educational content can be directly tied to the issue that the insured needs or wants to address.

The communications path provided by the Claims Wall enables automation of interactions, for example, for total loss actions. When a vehicle is a total loss, the insurer receives a valuation on the vehicle, adds appropriate taxes and fees and makes an offer to the insured for the total loss. The insured can verify the information about the vehicle (e.g., the right year, make, model, mileage, etc.), accept the offer, and a payment be issued. The Claims Wall enables automation of this process, including delivering the valuation and the offer to the insured and allowing the insured to accept the valuation so that that whole offer and acceptance process is streamlined and automated. In a particular implementation, a post and notification can be generated when the offer comes out, a link to the offer can be provided on the wall, the user can click the link to obtain information about the offer, options to accept or reject the offer can be provided, options to provide feedback on the offer or modify the offer, or the like can be facilitated through the Claims Wall. In addition to this loss scenario, the wall can be used to interact with the insured about specific activities occurring related to the claim. By clicking on a tab related to a rental vehicle, a post indicating that the insured is covered for a rental vehicle can be available, enabling the insured to click on a link to preferred providers, providing information about daily caps on the rental reimbursement, or the like.

Interactions through the Claims Wall enable real-time chat in a particular implementation. As an example, the presence of the adjuster could be indicated, providing the user with insight into whether the adjuster is available, on the phone, at their desk but not available, or the like. The presence of the insured could also be indicated, for example, whether the insured is logged onto the insurer's website, or the like. Once the presence of both the insured and the adjuster is indicated, a real-time chat could be initiated, with the dialogue recorded on the Claims Wall. During the messaging provided as part of the real-time chat, an indication that one of the parties is typing can be provided to dynamically indicate the progress of the chat session. In these embodiments, when a user logs into their wall and is looking at the Claims Wall, the system can determine if the representative or adjuster is available for a call or chat with the user. If the representative is available, an indication, such as a change in the color of the conversation can be implemented, a button could appear, an icon could be displayed, or the like to indicate the presence and availability of the representative for real-time interaction. In a similar manner, similar indications can be provided to the adjuster or representative when the user logs into the insurer's website. Additionally, if the adjuster has an action item related to the user, the action item can be raised to a higher priority when the user is available.

In another example, the user can indicate availability for real-time interaction, which would take the adjuster for their claim out of the phone queue so that they are available to interact with the user after completing their current task. Thus, interaction of the user with the Claims Wall can result in assignment of their adjuster to interact through a real-time interaction modality.

As an alternative, if the adjuster handling a particular claim is not available, the user can request that another adjuster that is available, with an adjuster selected based on ability and expertise in relation to the claim.

In another embodiment, the user can send an e-mail to the insurer through conventional e-mail channels and these emails will be captured on the Claims Wall. Thus, in addition to e-mails from the insurer to the insured or third parties being captured on the Claims Wall, e-mails through other channels can be routed to the Claims Wall.

When a user receives a notification that a post has been placed on the wall, the user could respond to that e-mail and it will post onto the wall. Thus, e-mails, regardless of channel, can be posted on the Claims Wall to enhance the user experience.

The following table provides a listing of entities that could either have Claims Walls or be able to access a Claims Wall associated with another entity. The list is not intended to be exclusive and limit embodiments of the present invention, but to provide examples of entities that can access information through the Claims Walls described herein.

Member/Customer
Spouse
Insured driver
Insured passengers
Insured pedestrian
Claimants (driver, owner, passenger, pedestrian)
Power of Attorney
Public Adjuster
Rental Car company
Appraiser
Direct Repair Company/Contractor
Attorney/Attorney Firm
Estate
Guardian
Responsible Person/Company
Witness
Suspect
Manufacturer
Moving & Storage
Other
Government Office
Expert
Lien Holder
Mortgagee
Property Association
Property Manager
Repairman
Tenant
Doctor
Employer
Heir
Hospital
Other insurance carrier The following table provides an exemplary list of navigation bar links and some details related to selection of these links. The list of links is not intended to be exclusive and limit embodiments of the present invention, but to provide examples of links that can be used to group, sort, or organize information accessible through the Claims Walls described herein.

| Navigation Bar link | Details |
| --- | --- |
| Claims Wall | Comprehensive view of conversations, uploaded documents, photos |
| Claim Overview and To Do List/Status | Loss Details (type of loss, date of loss, etc.), Loss status, Wall Owner's To Do List |
| Photos and Documents | Filtered view of photos and documents posted to the wall |
| Inspections | Details of Inspection appointment |
| Estimates | PDF of Estimates posted to the wall |
| Rental | Details of Rental (company, # of days allowed, # of days left) |
| Medical | Filtered view of medical related documents posted on the wall |
| Payments | List and Details of payments issued on Wall Owner's claim. |
| Coverage Summary | Policy/coverage information. |
| Things to Know About Your Claim | Graphical representations f important things specific to the claim. Examples: How Direct Repair Program Works, how to resolve cashing a 2 party check, What do I need to resolve my Total Loss, etc. |

In the embodiment illustrated in FIG. 1, links including some of the links in the table above are provided to enable grouping of subsets of posts based on category, subsets of documents, sorting of posts, viewing of posts by various entities, or the like. The links are not limited to the illustrated list but can include other links as appropriate to the particular applications.

Clicking on Claims Contacts will provide information on personnel related to your claim, including primary adjuster, injury adjuster, total loss adjuster, or the like, providing you with the contact card of each of the adjusters on your claim. As the adjusters are assigned, an entry would be posted on the Claims Wall, with this information also accessible from a tab such as the Claims Contacts. Access to the contact cards will provide a vehicle to contact the adjuster or other entity using one or more communications techniques such as texting, email, phone calls, or the like.

Some embodiments of the present invention are suitable for presenting information related to a claim as described herein. As examples, interactions and information can be provided related to the following categories:
Conversation
Ask a member service representative (MSR) a question/answer a question (members are a type of customer in some embodiments)

Chat—presence for MSR, for member
Member ask for extension of rental days
Provide un-fielded additional details (e.g., SSN or other information that is not included in a field on one or more insurance forms). In some embodiments, materials from the wall can be pulled and incorporated into fielded forms.
Post to specific MSR (e.g., total loss rep) Allow the member to choose recipient.
Forward content—email, text (reply)
MSR pick canned responses (templates)
Spell/grammar check for MSRs and Member
Reasonable character check (text limit)
Read/unread indicator for the member to know MSR read document and/or for the MSR to know the member read the document
Read receipt—request read receipt (for MSR and Member)
Allow MSR to delete/edit a message (not the Member in some embodiments)
   Removed by Insurer message for member when material is removed (may notify member)
Date, time stamp, from/to
Auto reply to member when work item is re-assigned to a different MSR
Create a private sticky note that is posted on the wall— Insurer viewable only in some embodiments and only viewable to other entities (e.g., member, doctor, etc.) in other embodiments
Auto initiate first message on wall
Allow an MSR or other entity to reassign a question/message to another MSR
Badge for new postings (e.g., a number indicator on a mobile device) (count of the number of messages that have not been read for Member)
"New" indicator on my accounts on the insurer's website (Either a "New" feature on the insurer's website or that the member has new postings on The Wall)
See my new messages
Screen/filter for profanity, etc., for angry words
Allow options for new and reply messages
Save draft
Pend MSR post for Manager review and approval prior to posting on the Claims Wall.
"New" indicator on loss summary for The Wall message(s) (unread messages exist)
"Set up alerts (push notification to the member, when I post to the wall)
This includes a short description of what was posted to The Wall."
Post comment for a specific photo or document
Auto refresh for MSR view of The Wall
   Documents
Upload document/photo (MSR and Member from all self-service channels)
View documents/photos on The Wall (MSR and member)
Scroll through photos e-sign document
View correspondence Give written statement Edit, submit, sign forms
Get forms (store standard forms on The Wall so the member can get to them)
File submission in correct electronic folder (auto file documents and photos)
Sign online agreement
Automatically post outbound correspondence (Letters— MSR and System generated)
From electronic records—expose/pull back electronic documents (edocs)
   Status
information about critical milestones in the claim file/process
information related to status of insurer's tasks (inspection complete, payment issued, etc.)
repair status of vehicle
police report or other third party documents
claims process map indicating the current status and future action items for the claim, which could be a tree structure with different beginning and end points
   General Information/Links
Who is my claims representative (contact list of people handling or related to the claim)
"Provide access to the member's "To Do" tasks on The Wall
   set up rental
   set up appraisal"
Provide access to the member's policy from The Wall—to view limits/deductibles/benefits (link to the policy page the member sees on Claims Status)
ability to escalate post to a manager if it is marked as a complaint
schedule call back
provide electronic funds transfer information give recorded statement (e.g., audio)
Reconstruct accident
Catastrophe (CAT)—tell me what to do, where to go
See a map of CAT-related things—drive-ins
Link to a cat wall—post weather maps
Search (Find capability on a word/phrase)
See a calendar of key dates—appraisal, rental through, historical activities, due dates
Click on thumbnail to view doc/foinilphoto (selecting)
Give feedback/rating on doctor, MSR, PDRP
See previous reviews on providers
Where I am related to my coverage limits
Link to car buying—CRS, home circle, auto circle, providing information when a vehicle or other property is a total loss
Marketing messages—eligibility check
Add "The Wall" to print claim file for legal discovery (need the ability to print everything from The Wall—this may be manual for project 1)
   Setup/Preferences/Personalization
set loss specific communication preferences—channel, times, address/phone
personalize page—photo, avatar, signature block
save as content to desktop/e-mail/cloud for instance (photos and documents) multiple tabs/views—photos only, timeline documents only
filter/sort list by type photo, doc, date, theme
Preferences of wall notifications—on/off, text, email (when certain things happen)
Photo of MSR
Bookmarks, flag item or view bookmarked item
   Access
allow attorney/spouse/etc. to see information (could be in addition to spousal access) allow spouse to post (or guardian, Power of Attorney, . . . )
view only access to The Wall for spouse/attorney invite bank MSR to offer bank loan
invite life MSR to purchase annuity settlement
Communicate with provider
Link to provider wall
Combine wall for related losses (homeowner, UPP, auto . . . )

Restrict Wall if fatality, glass/tow due to low value of claims, lawsuit, member rejects, sym losses, or the like. Restrictions for posting can be defined based on fields associated with the loss.

Define access for various entities

Define access for materials present on the Claims Wall Work Items

"Notify the member of a re-assignment or new split assignment

The Wall would be updated with the new MSR

Notifying the member of a new MSR or other updates from MSR's list of losses—see new message indicator Reporting Requirements Keep track and be able to report counts on:

conversations started by customer comments made by customer customer posts that included photos or documents conversations started by MSR comments made by MSR MSR posts that included photos or documents Company posts that were automated In some embodiments, creation of an electronic document by a claims adjuster will result in automatic posting of the electronic document on the Claims Wall. A member can view The electronic document, provides an electronic signature through the Claims Wall, and the like. The postings can be made automatically, manually, or the like. The content of the post can be partly automated, can be partly filled in by the MSR, or the like. During viewing of a message on the wall, the member can respond, which will both send the response to the MSR as well as result in a posting on the wall. Electronic signing by the member can result in a posting on the wall indicating the signature has been received. Thus, embodiments of the present invention provide a comprehensive treasury of information including audio files corresponding to voice mails and telephone calls and other media and information. Accordingly, a complete record of all interactions related to the claim are provided in some embodiments.

If a notification is received that indicates that a claim has been adjusted, an offer could be presented and posted on the wall. The customer can then view the offer and indicate acceptance in an interactive manner, typically using a form to accept the offer. The acceptance can then be posted on the wall indicating the acceptance. One of ordinary skill in the art would recognize many variations, modifications, and alternatives.

In relation to the catastrophe information above, a Catastrophe Wall can be built, with neighborhoods for which there is a high concentration of members being added to provide information to affected members. A wall could be created for the catastrophe, providing members in the vicinity of the catastrophe with relevant information such as the location of CAT operations, contact information, maps, or the like. Members living inside the CAT area can be added to the wall in an automated manner and e-mail blasts or other messages can be sent notifying them of the presence of the wall and building a sense of community.

In addition to insurance Claims Wall, embodiments of the present invention provide walls within walls, providing information on activities in addition to insurance claims.

Embodiments of the present invention are not limited to use in insurance claims processing, but are also applicable to other business activities, including banking, financial services, stock and bond activities, medical systems, and other suitable business systems.

Figure 6:
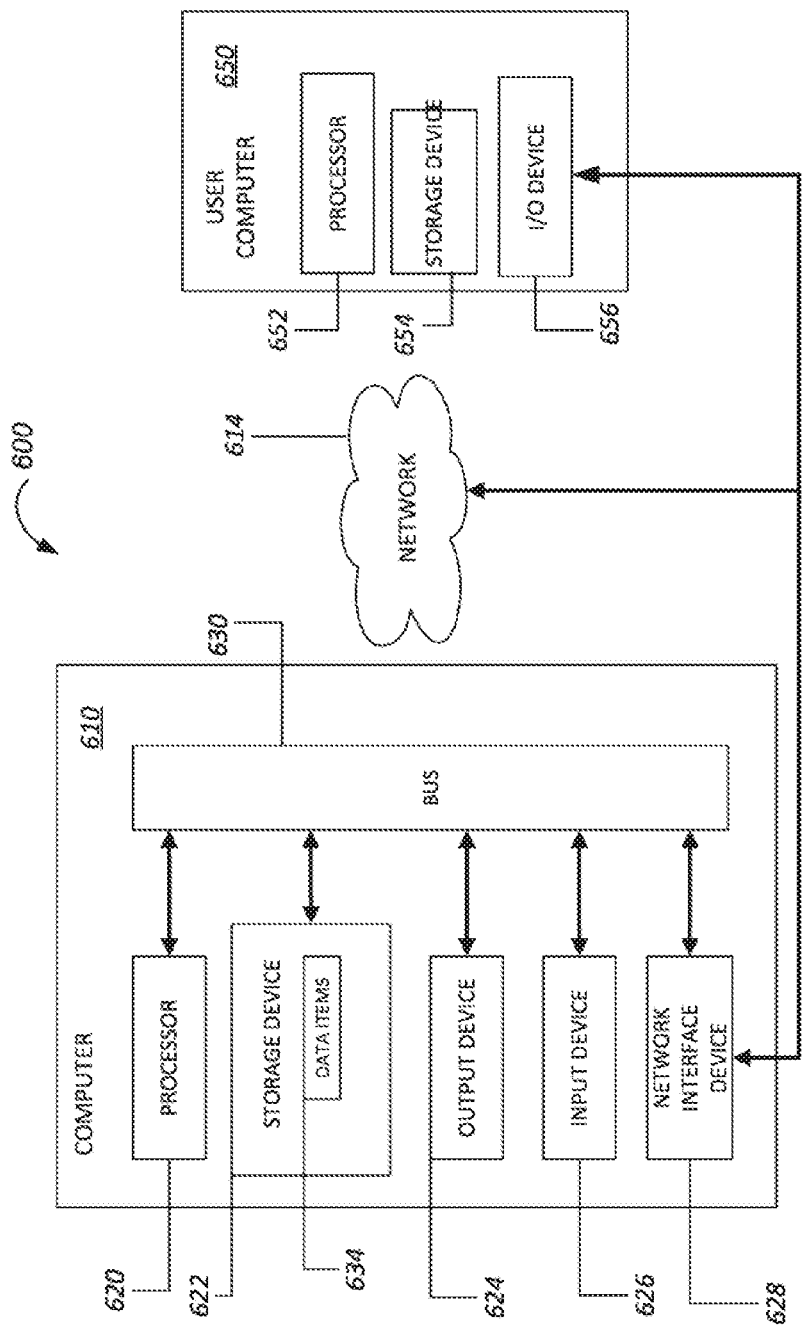
FIG. 6 illustrates a schematic diagram of a system for receiving insurance data.

FIG. 6 is high level schematic diagram illustrating a computer system including instructions to perform any one or more of the methodologies described herein. A system 600 includes a computer 610 connected to a network 230. The computer 610 includes a processor 620 (also referred to as a data processor), a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 230 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example on a server and accessed via the network 230.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 230 through any suitable communications protocol. The network interface device 628 sends and receives data items from the network 230.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), mobile phones, pocket computers, tablets, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 230 may be any suitable network and may support any appropriate protocol suitable for communication to the computer 610. In an embodiment, the network 230 may support wireless communications. In another embodiment, the network 230 may support hard-wired communications, such as a telephone line or cable. In another embodiment, the network 230 may support the Ethernet IEEE (Institute of Electrical and Electronics Engineers) 802.3x specification. In another embodiment, the network 230 may be the Internet and may support IP (Internet Protocol). In another embodiment, the network 230 may be a local area network (LAN) or a wide area network (WAN). In another embodiment, the network 230 may be a hotspot service provider network. In another embodiment, the network 230 may be an intranet. In another embodiment, the network 230 may be a GPRS (General Packet Radio Service) network. In another embodiment, the network 230 may be any appropriate cellular data network or cell-based radio network technology. In another embodiment, the network 230 may be an IEEE 802.11 wireless network. In still another embodiment, the network 230 may be any suitable network or combination of networks. Although one network 230 is shown, in other embodiments any number of networks (of the same or different types) may be present.

A user computer 250 can interact with computer 610 through network 230. The user computer 250 includes a processor 252, a storage device 254, and an input/output device 256. The description related to processor 620 and storage device 622 is applicable to processor 252 and storage device 254. As an example, the user computer 250 can be a personal computer, laptop computer, or the like, operated by a member of a membership organization (e.g., the present assignee). Using the user computer 250, the member can then interact with computer 610 operated by the present assignee through network 230 in order to access the present assignee's web pages or the like.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The attached Appendix provides additional description related to embodiments of the present invention, the disclosure of which is hereby incorporated by reference in its entirety for all purposes.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of managing networked communications between a plurality of parties, the method comprising:
   electronically receiving an indication of an insurance claim;
   generating a claim wall comprising a website page and associated with the insurance claim, wherein the claim wall is configured to be output to a user interface as one or more entries, wherein the one or more entries are output in a reverse chronological order on the user interface, and wherein each of the one or more entries is configured to display at least one comment associated with the entry;
   providing access to the claim wall for an insured party, an insuring party, and a third party service provider, wherein the user interface is configured to receive the at least one comment associated with the entry from at least one of the insured party, the insuring party, and the third party service provider;
   generating a process map associated with the insurance claim, the process map including one or more tasks and one or more-service level objectives associated respectively with the one or more tasks;
   posting the process map, including the one or more tasks and the one or more service level objectives, on the claim wall;
   identifying that an activity has occurred, wherein the activity relates to a status change of the one or more tasks; and
   populating the claim wall with status information regarding the status change of the one or more tasks.

2. The method of claim 1, the claim wall is accessible to at least one other party associated with the claim.

3. The method of claim 2, wherein access to the claim wall is restricted to the insured party, the insuring party, and the third party service provider.

4. The method of claim 1, a portion of the claim wall is provided using a secure interface.

5. The method of claim 4, wherein the status information includes confidential information restricted to the secure interface.

6. The method of claim 1, further comprising identifying a different mode of communication according to a type of loss associated with the insurance claim.

7. The method of claim 1, further comprising:
posting a second entry on the claim wall.

8. The method of claim 1, wherein the status information includes a voice call.

9. The method of claim 8, the third party service provider includes at least one of a doctor or an attorney.

10. A method comprising:
electronically receiving an indication of an insurance claim;
generating a claim wall comprising a website page and associated with the insurance claim, wherein the claim wall is configured to be output to a user interface as one or more entries, wherein the one or more entries are output in a reverse chronological order on the user interface, and wherein each of the one or more entries is configured to display at least one comment associated with the entry;
providing access to the claim wall for an insured party, an insuring party, and a third party service provider, wherein the user interface is configured to receive the at least one comment associated with the entry from at least one of the insured party, the insuring party, and the third party service provider;
generating a process map associated with the insurance claim, the process map including one or more tasks and one or more service level objectives associated respectively with the one or more tasks;
posting the process map, including the one or more tasks and the one or more service level objectives, on the claim wall;
identifying that an activity has occurred, wherein the activity relates to a status change of the one or more tasks; and
populating the claim wall with information regarding the status change of the one or more tasks.

11. The method of claim 10, further comprising:
providing an agreement related to the insurance claim using the claim wall;
receiving a network communication related to the agreement; and
electronically executing the agreement on behalf of the at least one of a party related to the insurance claim.

12. The method of claim 11, the agreement relates to a payment for the insurance claim.

13. The method of claim 11, the agreement relates to a rental associated with the insurance claim.

14. The method of claim 11, the agreement relates to service associated with the insurance claim.

15. The method of claim 10, further comprising posting an entry related to a milestone related to the insurance claim on the claim wall.

16. A non-transitory computer-readable medium comprising instructions for managing networked communications that cause a processor executing the instructions to effectuate operations comprising:
electronically receiving an indication of an insurance claim;
generating a claim wall comprising a website page and associated with an insurance claim, wherein the claim wall is configured to be output to a user interface as one or more entries, wherein the one or more entries are output in a reverse chronological order on the user interface, and wherein each of the one or more entries is configured to display at least one comment associated with the entry;
providing access to the claim wall for an insured party, an insuring party, and a third party service provider, wherein the user interface is configured to receive the at least one comment associated with the entry from at least one of the insured party, the insuring party, and the third party service provider;
generating a process map associated with the insurance claim, the process map including one or more tasks and one or more service level objectives associated respectively with the one or more tasks;
posting the process map, on the claim wall including the one or more tasks and the one or more service level objectives, on the claim wall;
identifying that an activity has occurred, wherein the activity relates to a status change of the one or more tasks; and
populating the claim wall with information regarding the status change of the one or more tasks.

17. The non-transitory computer-readable medium of claim 16, the insurance claim relating to a catastrophic cause.

18. The non-transitory computer-readable medium of claim 17, further comprising generating a catastrophe wall available to parties in a catastrophe area, the catastrophe wall including common information for a plurality of insurance claims including the insurance claim and catastrophe-related information.

19. The non-transitory computer-readable medium of claim 18, the catastrophe-related information including a catastrophe map, information about services available in the catastrophe area, and catastrophe-specific contact information.

20. The non-transitory computer-readable medium of claim 18, further comprising generating an adjuster view including a plurality of wall summaries.

* * * * *